United States Patent [19]

Pasqualini

[11] 3,837,080
[45] Sept. 24, 1974

[54] ARTIFICIAL ALLOPLASTIC ROOTS, FOR SUPPORTING AND RETAINING DENTURES

[76] Inventor: Ugo Pasqualini, Via Borgonuova 26, Milan, Italy

[22] Filed: June 13, 1973

[21] Appl. No.: 369,764

[52] U.S. Cl. ............................................. 32/10
[51] Int. Cl. ..................................... A61c 13/00
[58] Field of Search ................................. 32/10 A

[56] References Cited
OTHER PUBLICATIONS

Park Dental Research Co., Linkow Blade Vents, E44, 1 page, June 1971.
Implant Research Co., Plantanium Ventplants, 1 page, Oct. 1968.

*Primary Examiner*—Robert Peshock
*Attorney, Agent, or Firm*—Eric H. Waters

[57] ABSTRACT

An improved alloplastic root comprising an endo-osteal portion and a very short tail having a threaded free end and comprising too a stump formed with a threaded blind hole which can be screwed onto said threaded end.

The stump, extending into the mouth cavity, is screwed onto said threaded end only after having implanted the endo-osteal portion of alloplastic root and after a complete ossification thereof.

3 Claims, 2 Drawing Figures

ARTIFICIAL ALLOPLASTIC ROOTS, FOR SUPPORTING AND RETAINING DENTURES

This invention relates to improvements in, and to artificial alloplastic roots, for supporting and retaining dentures. Known is, years since, to persons skilled in the art, that the recourse to artificial alloplastic roots, made of biologically neutral materials, as e.g., tantalum, titanium, the stellities, the platinum-plated gold, the platinum-iridium alloys, is being extensively made for supporting and retaining dentures. Retentive structural features, as e.g., holes or corrugated or sawtooth shaped lands are shown by such artificial roots, whereby to allow for a fibro-osteal regeneration, and thus for the retention of same roots.

A few types of artificial alloplastic roots are shaped like small baskets or similar perforated bodies, by which the anatomy of natural roots is roughly reproduced. Further types of artificial roots are shaped as flat blades, that can be driven into suitable slots, previously made in the osteal structure of jaw. However, is a safe and reliable fixing of such blades is to be attained, it is essential that a fibro-osteal regeneration should occur all along the free edges of same blades, once inserted.

All the aforementioned artificial alloplastic roots are fitted with one or more pins or stumps which, after the implantation of same roots, extends through the mucosa and into the mouth cavity, being the fixed dentures fastened thereon, and being said stumps obviously integral with the remaining portion of artificial roots.

A few drawbacks are shown by the already known alloplastic roots, due to the presence of stup integral therewith. As a matter of fact, the relatively long stumps extending into the mouth cavity, are subjected to even rather heavy pressure, and in particular bending stresses by the tongue and in the course of mastication. Such stresses are transmitted to endo-osteal root portion, thus delaying and interfering with the ossification, as required to have same roots permanently fixed. Stated what precedes, this invention intends to improve the already known alloplastic roots, whereby to remove the stated drawbacks, and in particular to prevent traumas and to allow for a quick fibro-osteal renegeration in the endo-osteal root portions.

The artificial alloplastic roots according to the invention comprise an endo-osteal portion and at least one stump, extending into the mouth cavity, to allow for the fitting of a fixed denture thereon, and are characterized in that the endo-osteal portion and the stump(s) are produced separately, and can be easily and permanently coupled with each other after the implantation of endo-osteal portion only, being latter portion formed with at least one short threaded extension, whereon the also suitably threaded stump can be screwed.

The invention will be better understood from a consideration of the following description of a preferred embodiment form thereof, as shown in the accompanying drawing, being both description and drawing given as a non restrictive example. In same drawing.

Figure 1:
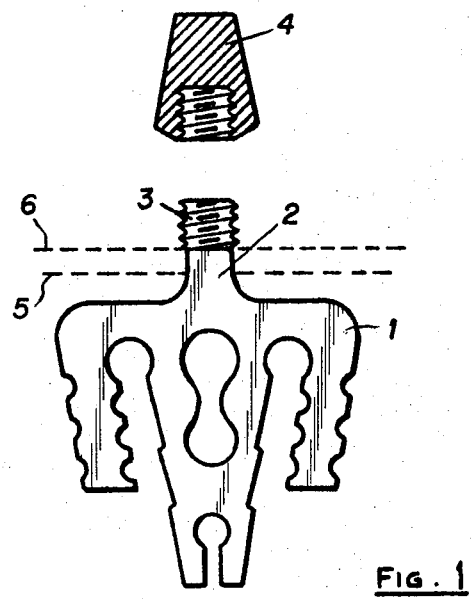
FIG. 1 is a part sectioned front elevation of an artificial root, fitted with a single stump, being said components shown spaced from each other.

The artificial alloplastic root is shown in the drawing in the form of an already known thin blade 1, which is designed to be implanted into a slot cut in the maxilla bone. However, it is to be pointed out that the endo-osteal portion of root may be formed as a blade having a shape other than that as shown in the drawing, and may also not be blade-shaped; e.g., it may be shaped as a little basket or the like.

Figure 2:
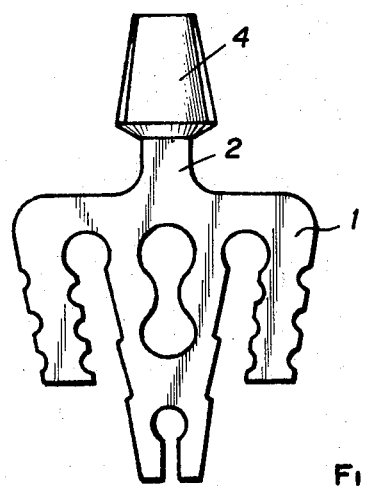
FIG. 2 is the assembled artificial root.

The peculiar feature of artificial root consists in that a very short tail extends therefrom, being such tail formed by a very thin neck 2, having a thickness about equal to that of a blade 1, and by a head 3, integral therewith, and which outer surface is threaded, as clearly shown in the FIG. 1. The root is completed by a shaped stump 4, having one front side formed with a threaded blind hole, as shown also in the FIG. 1. The sizes of head 3 are such that the stump 4 can be firmly and permanently screwed thereon, whereby the assembled root takes the form as shown in the FIG. 2, i.e. of a conventional alloplastic root.

In the case of considered root, the blade 1 is firstly driven into the slot of maxilla bone, which outer contour is indicated by the dash line 5 in the FIG. 1, while th outer contour of mucosa is shown by the dash line 6. It follows that, after having implanted the endo-osteal portion of alloplastic root, the threaded head 3, or a small portion thereof only extends into the mouth cavity, i.e., beyond the mucosa. Owing to very small sizes of root portion that extends into the mouth cavity, same root cannot be submitted to appreciable stresses, whereby traumas are prevented, and a quick and complete ossification is obtained, thus ensuring a firm retention of dental prosthesis.

After a satisfactory ossification and cicatrization, it will be sufficient to screw the stump 4 onto the threaded head 3, to obtain a firm and stable structure, whereon the dental prosthesis can be fitted in the conventional way.

It is to be understood that may obvious changes and modifications may be made in the structure as specified above. Thus, e.g., a threaded blind hole could be formed in the head 3, whereinto a threaded pin extending from the stump can be screwed. Moreover, as it can be readily appreciated, two or more distinct stumps, as previously described, can be fastened to same root.

I claim:

1. An improved dental implant, comprising an endo-osteal portion and at least one shaped removable stump extending into the mouth cavity for applying a dental prosthesis thereto, said endo-osteal portion and said stumps being single pieces connectable to each other, said endo-osteal portion having a substantially short tail with a threaded free end, one front side of said stump having a threaded blind hole for screwing onto said threaded end.

2. An artificial dental implant according to claim 1, wherein the thread of said tail is formed on the outer surface of said tail, said tail being substantially thickened at the thread, the thread of said stump is being formed in the inner side of a blind hole extending from a front side of said stump.

3. An artificial dental implant according to claim 2, wherein the threaded portion of said tail is connected with the endo-osteal root portion through a neck having a slightly reduced thickness.

* * * * *